United States Patent [19]
Kuijk et al.

[11] Patent Number: 4,958,152
[45] Date of Patent: Sep. 18, 1990

[54] DISPLAY DEVICE AND METHOD OF DRIVING SUCH A DEVICE

[75] Inventors: Karel E. Kuijk; Martinus V. C. Strooker, both of Eindhoven, Netherlands

[73] Assignee: U.S. Philips Corporation, New York, N.Y.

[21] Appl. No.: 208,208

[22] Filed: Jun. 16, 1988

[30] Foreign Application Priority Data

Jun. 18, 1987 [NL] Netherlands ............... 8701420
Jan. 28, 1988 [NL] Netherlands ............... 8800204
Mar. 22, 1988 [NL] Netherlands ............... 8800704

[51] Int. Cl.$^5$ .................................................. G09G 3/36
[52] U.S. Cl. ........................................ 340/784; 340/719; 350/333
[58] Field of Search ............... 340/784, 811, 805, 719, 340/785, 787, 775, 752, 765; 350/332, 333, 334

[56] References Cited

U.S. PATENT DOCUMENTS

| | | | |
|---|---|---|---|
| 3,654,606 | 4/1972 | Marlowe et al. | 340/784 |
| 4,223,308 | 9/1980 | Baraff et al. | 340/719 |
| 4,251,136 | 2/1981 | Miner et al. | 350/334 |
| 4,626,841 | 12/1986 | Togashi | 340/784 |
| 4,748,445 | 5/1988 | Togashi et al. | 340/784 |
| 4,794,385 | 12/1988 | Kuigk | 340/719 |
| 4,810,059 | 3/1989 | Kuigk | 340/784 |
| 4,811,006 | 3/1989 | Kuigk | 340/719 |

*Primary Examiner*—Alvin Oberley
*Assistant Examiner*—M. Fatahiyar
*Attorney, Agent, or Firm*—John C. Fox

[57] ABSTRACT

In a picture display device driven with an active matrix the voltage across the picture elements (12) is accurately adjusted by discharging or charging the associated capacitances, if necessary, first to beyond the transition range (17) in the transmission/voltage characteristic.

16 Claims, 3 Drawing Sheets

DISPLAY DEVICE AND METHOD OF DRIVING SUCH A DEVICE

BACKGROUND OF THE INVENTION

The invention relates to a display device comprising an electro-optical display medium between two supporting plates, a system of picture elements arranged in rows and columns, with each picture element being formed by picture electrodes arranged on the facing surfaces of the supporting plates, and a system of row and column electrodes for presenting selection and data signals by means of which a range of voltages dependent on the electro-optical display medium can be presented across the picture elements for the purpose of picture display.

The invention also relates to a method of driving such a display device.

A display device of this type is suitable for displaying alphanumerical information and video information by means of passive electro-optical display media such as liquid crystals, electrophoretic suspensions and electrochromic materials.

A display device of the type described in the opening paragraph is known from Netherlands Patent Application No. 8502663 laid open to public inspection, in the name of the Applicant. In the device shown in this Application diodes are used as non-linear switching elements in an active matrix, namely two diodes per picture element. Two successive rows of picture elements each time have one row electrode in common. The drive mode is such that in television applications (for example, with a drive mode in accordance with the PAL or NTSC system) the information of two successive even and odd lines is presented across each picture element at an alternating polarity and at the field frequency. The information of a picture element is therefore determined by the average signal of two successive even and odd lines. Since each time two rows of picture electrodes are simultaneously written, because two successive rows each time have one row electrode in common, such a device provides little flexibility as regards the choice of colour filters to be used. In practice, this choice is limited to strip-shaped colour filters.

U.S. Patent Application Ser. No. 208,185, filed Jun. 16, 1988 in the name of the Applicant describes a picture display device of the type mentioned in the opening paragraph in which the row electrodes are not common and in which the rows of picture elements are separately driven without the omission of common row electrodes leading to an increase of the number of connections.

This ensures a considerable freedom regarding the colour filters to be used. This is possible by giving the picture elements a given adjustment per row by charging or discharging the capacitances associated with these picture elements after first having discharged or charged them too far (whether or not accurately).

In the said Patent Application this is realised by applying, prior to selection, an auxiliary voltage across the picture elements beyond or on the limit of the voltage range to be used for picture display, for example, by means of an auxiliary voltage (reference voltage) or a reset voltage.

In a preferred embodiment of the device described in said Patent Application a Zener diode is arranged between a picture element and a row or column electrode. When using such a device, the breakdown behaviour of the Zener diodes used also determines the operating voltages to be used, and the minimum Zener breakdown voltage limits the number of electro-optical media to be used. Moreover, Zener diodes in the technology employed in circuits for liquid crystal devices (amorphous silicon, polycrystalline silicon) are difficult to manufacture in a reproducible manner. It is an object of the invention to meet these drawbacks by providing an alternative solution.

SUMMARY OF THE INVENTION

To this end a device according to the invention is characterized in that it comprises at least a first branch arranged between a picture electrode and a row or column electrode and including at least one non-linear switching element for applying, prior to selection, an auxiliary voltage across the picture elements beyond or on the limit of the voltage range to be used for picture display, and in that it comprises, per picture element, a second branch arranged between the picture electrode and the row or column electrode and including at least one non-linear switching element which is arranged anti-parallel to the non-linear switching element in the first branch.

The first branch preferably comprises a series arrangement of non-linear switching elements, such as diodes.

The series arrangement and the anti-parallel arranged switching element can be adapted to be such that a switching behaviour analogous to that of a Zener diode can be obtained, but this with a better reproducibility.

The auxiliary voltage is preferably located beyond or on the limit of the range of transition in the transmission/voltage characteristic of the electro-optical medium.

The auxiliary voltage may now be a reset voltage so that all picture elements in a row are first charged negatively or positively to a given value and are subsequently charged or discharged to the correct signal value, dependent on the data signals presented.

Since this is effected for each individual row without a subsequent row or a previous row being influenced, the picture information can be adapted to a colour filter to be used, which colour filter may be composed of, for example, triplets as described, for example, in U.S. Pat. No. 4,908,609, issued Mar. 13, 1990, name of the Applicant, or it may have, for example, a diagonal structure.

Discharging and charging prior to the actual driving operation with the picture information can be effected during the same line period in which the picture information is presented, but also during the preceding line period.

Since each row of picture elements is now separately written, the voltage across these picture elements can also be inverted per row, which leads to a higher face-flicker frequency and hence to a steadier picture. Diodes are preferably chosen for the non-linear switching elements; in this case it is advantageously possible to use redundancy as described in U.S. Patent Application Ser. No. 208,104 filed Jun. 16, 1988 in the name of the Applicant.

The first branch, which may comprise a series arrangement of non-linear switching elements (or a single non-linear switching element such as, for example, a MIM), may be arranged for each picture element separately.

A preferred embodiment of a device according to the invention, which hardly requires any extra components (notably with larger numbers of rows) as compared with the device described in the said patent application Ser. No. 208,185, is characterized in that a plurality of (and preferably all) picture elements of a column have the first branch at least partly in common. The common part may also be used for two (juxtaposed) columns.

A method according to the invention is characterized in that at least a first branch including at least one non-linear switching element and, per picture element, a second branch including at least one non-linear switching element connected anti-parallel thereto are arranged between the picture elements and the row electrodes or the column electrodes, and in that, prior to presenting a data signal, the picture elements are charged or discharged by means of the first branch to a voltage beyond or on the limit of the voltage range to be used for picture display and are subsequently discharged or charged to the correct value via the anti-parallel connected switching element.

DESCRIPTION OF THE DRAWINGS

The invention will now be described in greater detail, by way of example, with reference to the accompanying drawings in which.

DETAILED DESCRIPTION OF THE PREFERRED EMBODIMENTS

Figure 1:
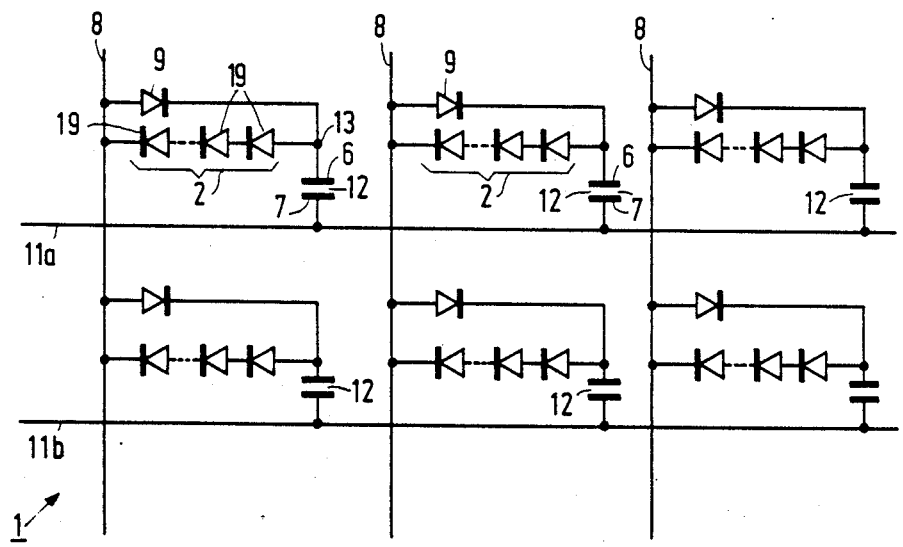
FIG. 1 is a diagrammatic representation of the device.

FIG. 1 shows diagrammatically the display device 1 according to the invention. Picture elements 12, constituted in a liquid crystal display device, for example, by facing picture electrodes 6, 7 enclosing a layer of liquid crystal material, are connected via the picture electrodes 7 to row electrodes 11 which together with the column electrodes 8 are arranged in the form of a matrix. The picture electrodes 6 of the picture elements 12 are connected to column electrodes 8 via diodes 9. They are also connected via a series arrangement 2 of diodes 19 to a column electrode 8.

Figure 2:
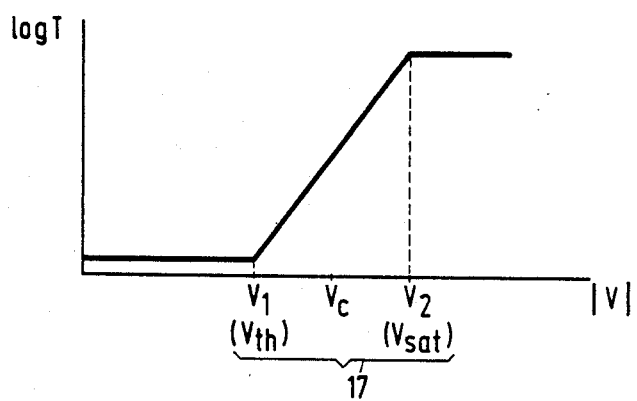
FIG. 2 shows the associated transmission/voltage characteristic.

FIG. 2 shows diagrammatically a transmission/voltage characteristic of a display cell in the display device of FIG. 1. Below a given threshold voltage ($V_1$ or $V_{th}$) the cell substantially passes no light, whereas above a given saturation voltage ($V_2$ or $V_{sat}$) the cell is substantially entirely transparent. The intermediate range constitutes the above-mentioned range of transition and is indicated in FIG. 2 by means of a brace 17. In this respect it is to be noted that the absolute value of the voltage is plotted on the abscissa, because such cells are usually driven at an alternating voltage.

For writing information a first selection voltage $V_{s1}$ is presented on a selection line 11 during a selection period $t_s$ while the information or data voltages $V_d$ are simultaneously presented on the column electrodes 8; this leads to a positive voltage across a picture element 12 which represents the information presented.

To prevent degradation of the liquid crystal and to be able to increase the so-called face-flicker frequency, information having an alternating sign is preferably presented across the picture element 12. In a device according to the invention a negative voltage across the picture element 12, which represents the information presented, is achieved by presenting a second selection voltage $V_{s2}$ while simultaneously presenting inverted data voltages ($-V_d$) after having discharged the capacitance associated with the picture element 12 too far (or having negatively charged it too far) via the series arrangement 2 of diodes 19.

FIG. 3 shows how the drive signals are chosen for a plurality of rows of picture elements 12 in order to write them with picture information which changes sign during each field (for example, in TV applications).

From the instant $t_0$ (see FIG. 3a) a selection voltage $V_{s1}$ is presented on a row electrode 11 during a selection period $t_s$ (which in this example is chosen to be equal to a line period for TV applications, namely 64 μsec) while information voltages or data voltages $V_d$ are simultaneously presented on the column electrodes 8. After the instant $t_1$ the associated row of picture elements 12 is no longer selected because the row electrode 11 receives a voltage $V_{ns1}$. This voltage is maintained until just before the next selection of the row of picture elements 12. In this example this is effected by giving the selection line 11a a reset voltage just before selecting the first row of picture elements 12 again, namely at an instant $t_3 = t_f - t_s$ in which $t_f$ represents a field period. The reset voltage can then be chosen to be such that the picture elements 12 of the series arrangement 2 of diode 19 are charged negatively to such an extent that the voltage across each of the associated picture elements lies beyond the range to be used for picture display (up to a value of $\leq -V_{sat}$). In a subsequent selection period (from $t_4$) they are then charged to the desired value determined by data voltages $-V_d$ via diodes 9. To this end the row electrodes receive the voltage $V_{s2}$ and after the selection period (after $t_5$) has elapsed, they receive a non-selection voltage $V_{ns2}$. In this way the voltage across the picture elements is inverted during each field period.

Figure 3A:
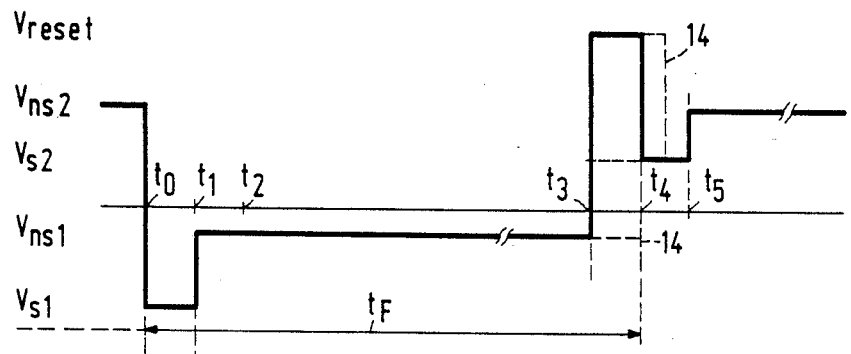
FIGS. 3a–3c show some drive signals associated with the device.
Figure 3B:
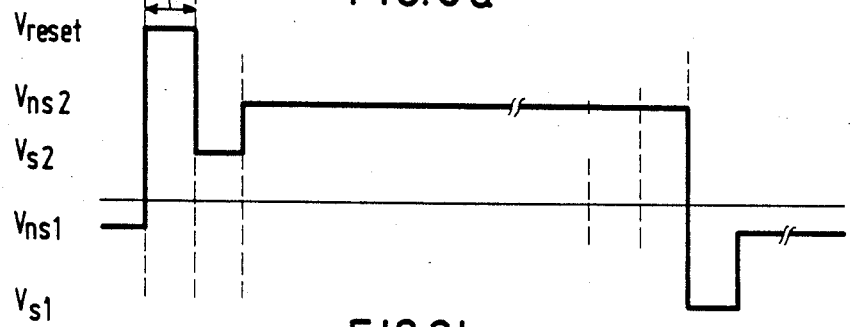
Figure 3C:
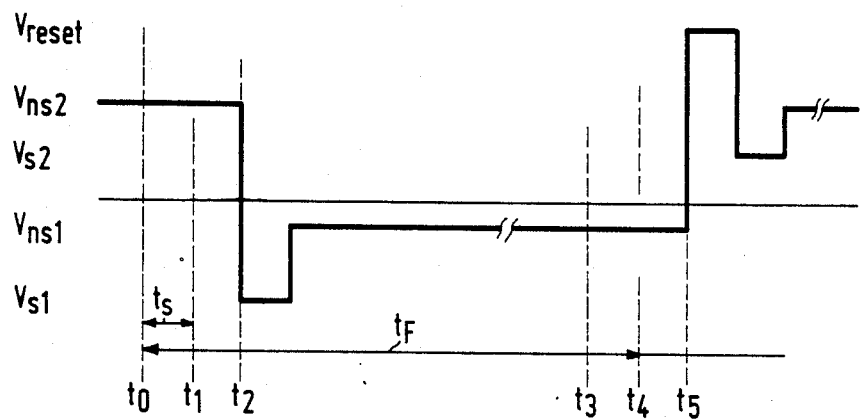

FIG. 3b shows the same voltage variation as FIG. 3a, but is then shifted over a field period plus a selection period (in this case a line period). This provides the possibility of writing two successive rows of picture elements with inverse data voltages with respect to each other. FIG. 3c is identical to FIG. 3a, but is shifted over two selection periods.

For (television) pictures with half the vertical resolution in which the lines of the even and the odd field are written over each other, it is achieved that the picture information changes its sign and is refreshed once per field period. Although the line-flicker frequency is 25 Hz (30 Hz) in this case, a face-flicker frequency of 50 Hz (60 Hz) is achieved between successive rows due to the phase difference of 180° introduced by changing the sign per row.

The selection voltages $V_{s1}$ and $V_{s2}$ may of course also be chosen to be shorter than one line period (64 μsec). In this case the reset voltage may alternatively be presented during a part of the line period in which selection takes place, provided there is sufficient time left to charge the picture elements 12. The voltage variation on the electrodes 11 is then effected, for example, in the way as shown diagrammatically in FIG. 3a by means of the broken line 14.

The device shown is very suitable for using a drive method in which $$V_c = \frac{V_{sat} + V_{th}}{2}$$

is chosen for the average voltage across a picture element (see FIG. 3) so that the absolute value of the voltage for the purpose of picture display across the picture elements 12 is substantially limited to the range between $V_{th}$ and $V_{sat}$.

A satisfactory operation as regards grey scales is obtained if, dependent on the data voltages $V_d$ on the column electrodes 8, the voltage values across the picture elements 12 are at most $V_c+V_{dmax}=V_{sat}$ and at least $V_c-V_{dmax}=V_{th}$. Elimination of $V_c$ yields:

$$|V_d|_{max}=\tfrac{1}{2}(V_{sat}-V_{th})$$

That is to say:

$$-\tfrac{1}{2}(V_{sat}-V_{th})\leq V_{dmax}\leq \tfrac{1}{2}(V_{sat}-V_{th}).$$

In order to charge a row of picture elements 12, for example, positively, the associated row electrode 11 is given a selection voltage $V_{s1}=-V_{on}-\tfrac{1}{2}(V_{sat}+V_{th})$ in which $V_{on}$ is the forward voltage of the diode 9. The voltage across the picture element 12 is therefore $V_d-V_{on}-V_{s1}$; it ranges between $$-\tfrac{1}{2}(V_{sat}-V_{th})+\tfrac{1}{2}(V_{sat}+V_{th})=V_{th}$$

and $$\tfrac{1}{2}(V_{sat}-V_{th})+\tfrac{1}{2}(V_{sat}+V_{th})=V_{sat},$$

dependent on $V_d$.

In order to negatively charge the same row of picture elements 12 (in a subsequent field or frame period) at a subsequent selection with inverted data voltages, these are first charged negatively too far by means of a reset voltage $V_{reset}$ on the row electrode 11 via diodes 19 connected to the reference voltage. Subsequently the selected row electrode receives a selection voltage $V_{s2}=V_{on}+\tfrac{1}{2}(V_{sat}+V_{th})$ (in the same line period or in a subsequent period). The picture elements 12 which are negatively charged too far are now charged via the diodes 9 to $V_d-V_{on}-V_{s2}$, that is to say, to values between $$-\tfrac{1}{2}(V_{sat}-V_{th})-\tfrac{1}{2}(V_{sat}-V_{th})=-V_{sat}$$

and $$\tfrac{1}{2}(V_{sat}-V_{th})-\tfrac{1}{2}(V_{sat}-V_{th})=-V_{th},$$

so that information with the opposite sign is presented across the picture elements 12.

In the case of non-selection the requirement must be satisfied that neither diodes 9 nor diodes 19 can conduct, or they should convey such a low current $I_{off}$ associated with a voltage $V_{off}$ that discharge via the diodes 19 is substantially negligible.

For a lowest non-selection voltage $V_{ns1}$ it holds that the voltage $V_A$ at the junction point 13 ranges between the values:

$$V_{Amin}=V_{ns1}+V_{th} \tag{1}$$

and $$V_{Amax}=V_{ns1}+V_{sat} \tag{2}$$

For the values $V_{Amin}$ and $V_{Amax}$ it holds that:

$$V_{Amax}\leq -V_{dmax}+rV_{off} \tag{3}$$

where r is the number of diodes 19 in the series arrangement 2. Discharge via the diode 9 must also be prevented, thus it holds that:

$$V_{Amin}\geq V_{dmax}-V_{off} \tag{4}$$

Equations (1) and (4) lead to:

$$+V_{dmax}-V_{off}\geq V_{ns1}+V_{th}$$

or (with $V_{dmax}=\tfrac{1}{2}(V_{sat}-V_{th})$).

$$V_{ns1}\geq -\tfrac{1}{2}(V_{sat}-V_{th})-V_{off}-V_{th} \tag{5}$$

Equations (2) and (4) also lead to:

$$-V_{dmax}+rV_{off}\geq V_{ns1}+V_{sat}$$

or $$V_{ns1}\leq -\tfrac{1}{2}(V_{sat}-V_{th})-V_{sat}+rV_{off} \tag{6}$$

combination of (5) and (6) leads to:

$$-\tfrac{1}{2}(V_{sat}-V_{th})-V_{sat}+rV_{off}\geq V_{ns1}\geq$$

$$\tfrac{1}{2}(V_{sat}-V_{th})-V_{off}-V_{th}$$

or $$\frac{r+1}{2}V_{off}\geq (V_{sat}-V_{th}) \tag{7}$$

If the number r of diodes is chosen to be such that $$\frac{r+1}{2}V_{off}=(V_{sat}-V_{th}) \tag{8}$$

it holds that:

$$V_{ns1}=-\tfrac{1}{2}(V_{sat}+V_{th})+\frac{r+1}{2}V_{off} \tag{9}$$

The picture elements 12 are subsequently discharged (see FIG. 3a) to a value $-V_{sat}$ by giving the row electrode 11a a sufficiently high reset voltage. Here it holds that:

$$V_{reset}\geq V_{dmax}+V_{sat}+rV_{on}$$

or $$V_{reset}\geq \tfrac{1}{2}(V_{sat}-V_{th})+V_{sat}+rV_{on}$$

Subsequently, the picture elements are accurately charged via the diodes 9. To this end a selection voltage $V_{S2}=\tfrac{1}{2}(V_{sat}+V_{th})-V_{on}$ is presented to the row electrode 11a whilst data voltages are simultaneously presented on the column electrodes 8.

Then the row electrode 11a is given a non-selection voltage $V_{ns2}$. For the voltages at the junction point 14 it now holds that:

$$V_{Amax} = V_{ns2} - V_{th} \text{ en } V_{Amin} = V_{ns2} - V_{sat}$$

With the equations (3) and (4) and $V_{dmax} = \tfrac{1}{2}(V_{sat} - V_{th})$ this leads to:

$$V_{ns2} \leq -V_{dmax} + rV_{off} = -\tfrac{1}{2}(V_{sat} - V_{th}) + V_{th} + rV_{off} \quad (10)$$

and $$V_{ns2} \geq V_{dmax} - V_{off} + V_{sat} = +\tfrac{1}{2}(V_{sat} - V_{th}) - V_{off} + V_{sat} \quad (11)$$

Combination of (10) and (11) leads to:

$$\tfrac{1}{2}(V_{sat} - V_{th}) - V_{off} + V_{sat} \leq -\tfrac{1}{2}(V_{sat} - V_{th}) + rV_{off} \quad (12)$$

so that it holds again that:

$$\frac{r+1}{2} V_{off} \geq (V_{sat} - V_{th}) \quad (7')$$

If r is again chosen to be such that:

$$\frac{r+1}{2} V_{off} = (V_{sat} - V_{th}) \quad (8')$$

it holds that:

$$V_{ns2} = \tfrac{1}{2}(V_{sat} + V_{th}) + \frac{r-1}{2} V_{off} \quad (13)$$

The usability of this device is thus determined by the minimum voltage $V_{off}$ and the maximum width of the range of transition in the transmission/voltage characteristic (denoted by the brace 17 in FIG. 2) of the relevant liquid crystalline material or another electro-optical medium.

A similar restriction holds for a display device in which the switching elements are made of so-called diode rings. In such a switching element, built up of a circuit arrangement of n diode rings of two diodes, the condition holds that $n V_{off} \geq (V_{sat} - V_{th})$ while 2n diodes are required for each picture element.

If, for example, $V_{sat} - V_{th} = 1.8$ Volt and $V_{off} = 0.4$ Volt, the minimum number of diodes is $n = 10$ when using diode rings, and $r + 1 = 9$ in the device of FIG. 1.

In the embodiment of FIG. 1 the picture elements 12 are always charged or discharged via one diode 9 during writing. The spread in the forward voltage $V_{on}$ of these diodes in the complete device is approximately 20 mV, i.e. 1/90 of the range $(V_{sat} - V_{th})$. This leads to a greater uniformity than in devices having a plurality of diode rings in which the spread increases cumulatively with the number of diode rings.

Figure 4:
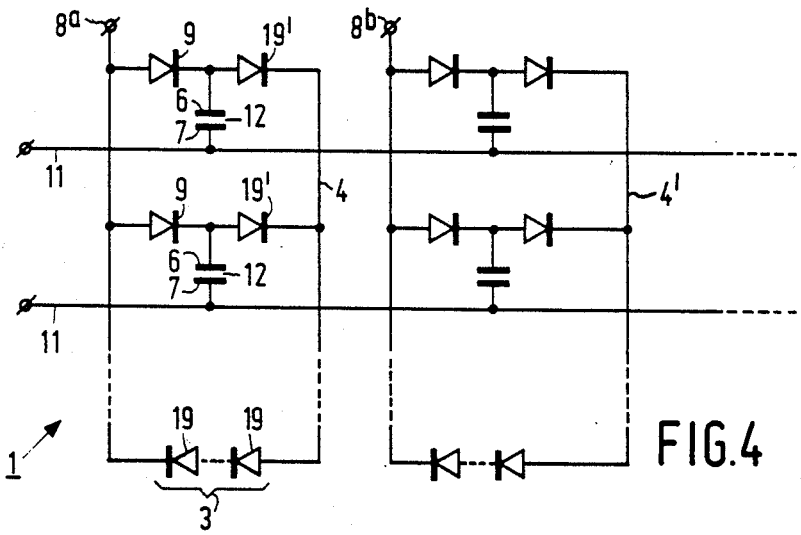
FIG. 4 shows a modification of the previous device.

The number of diodes can be reduced considerably by forming a part of the diode branch 2 in common for a number or a plurality of picture elements in one column. This is shown in FIG. 4. The common diode branch 3 now comprises $(r-1)$ diodes 19, whilst each picture electrode 6 is connected via a diode 19' to the common electrode 4 which is connected to the common part 3' of the series arrangement of $(r-1)$ diodes 19. The series arrangement 3 is used every line period for charging or discharging successive rows of picture elements. As compared with the device of FIG. 1, $(n-1) \cdot (r-1)$ fewer diodes will now suffice ($n$ = number of rows).

Figure 5:
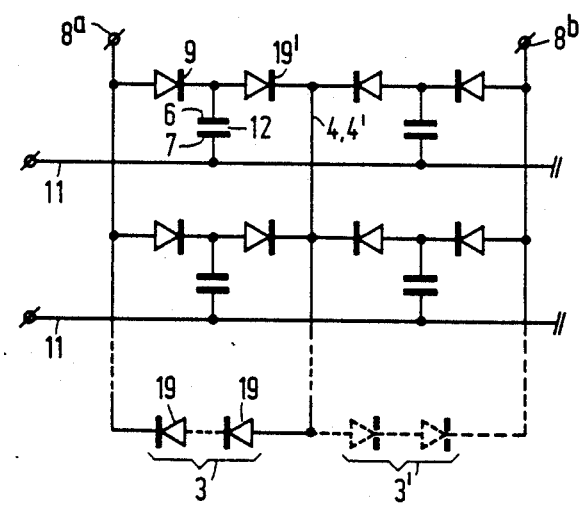
FIG. 5 shows another embodiment of a device according to the invention.

Moreover, the diode branch 3 may be used in common for two columns, as is shown in FIG. 5. This Figure is obtained by introducing the mirror image of the right-hand column about an axis parallel to the column direction, with the electrodes 4 and 4' being formed as a common electrode. Advantageously, a diode branch 3' (denoted by broken lines) may be arranged in the right-hand column, so that it is actually redundant.

Redundancy in the various elements may of course also be obtained by doubling the diodes (in series and/or parallel), as described in greater detail in the application Ser. No. 208,184 in the name of the Applicant.

Figure 6A:
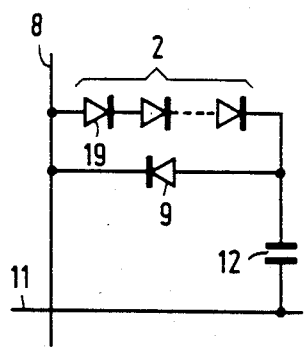
FIGS. 6a through c show some modifications of the device according to FIG. 1.
Figure 6B:
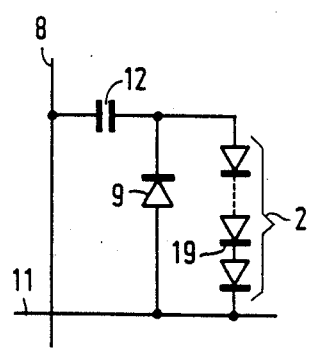
Figure 6C:
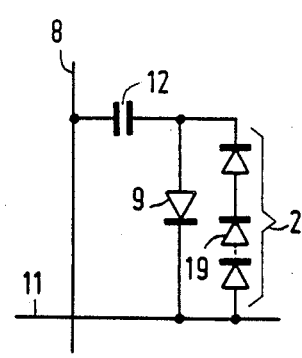

The diodes in the device shown in FIG. 1 may alternatively be arranged in the reverse direction, or they may be arranged between the column electrode 8 and the picture element 12, as is shown diagrammatically in FIG. 6. For such configurations similar expressions as for the device of FIG. 1 can be derived for the (non-) selection voltages, data voltages and reset voltage, while the same voltage values of the drive signals apply to, for example, the device of FIG. 6b and the inverted voltage values apply to the circuits of FIGS. 6a and 6c.

The invention is of course not limited to the embodiments shown, but several variations are possible within the scope of the invention.

Non-linear switching elements other than diodes are suitable such as, for example, bipolar transistors with short-circuited base-collector junctions or MOS transistors whose gate is short-circuited with the drain zone. Notably, the series arrangements 2, 2' and 3, 3' of diodes may be replaced by a MIM element (metal-insulator-metal) having such a current/voltage characteristic that the picture elements 12 can be discharged by means of a reset voltage (or charged in the case of diodes with reversed sign). The diode 9 and the MIM element then again have a behavior analogous to that of one Zener diode. There are also various possibilities for the diodes themselves. In addition to the diodes which are conventionally used in the technology for display devices, for example, a pn diode, Schottky diode or pin diode formed in monocrystalline, polycrystalline or amorphous silicon, CdSe or another semiconductor material may be considered, while the diodes may be formed both vertically and laterally.

Moreover, the availability of a reset voltage renders the above-described device and method particularly suitable for use in a ferro-electric display medium as described in the U.S. Pat. No. 4,840,462, issued Jun. 20, 1989, in the name of the Applicant.

What is claimed is:

1. A display device comprising an electro-optical display medium between two supporting plates, a system of picture elements arranged in rows and columns, with each picture element being formed by picture electrodes arranged on the facing surfaces of the supporting plates, and a system of row and column electrodes for presenting selection and data signals by means of which a voltage can be presented across the picture elements for the purpose of picture display, at least a first branch arranged between each picture electrode and a row or column electrode and including at least one non-linear switching element, and a second branch arranged between each picture electrode and the row or column electrode and including at least one non-linear switching element which is arranged antiparallel to the non-linear switching element in the first branch, characterized in that the threshold voltage of the second branch is different from the threshold voltage of the first branch, so that prior to presenting a picture display signal by means of the second branch, the picture elements may be charged or discharged by means of the first branch to a voltage beyond or on the limit of the voltage range to be used for picture display.

2. A display device as claimed in claim 1, characterized in that the first branch comprises a series arrangement of non-linear switching elements.

3. A display device as claimed in claim 2, characterized in that the first branch is a series arrangement of diodes.

4. A display device as claimed in claim 1, characterized in that the first branch includes a metal-insulator-metal element.

5. A display device as claimed in claim 1, characterized in that at least a part of the first branch including at least one non-linear switching element is common for a plurality of picture elements in a column.

6. A display device as claimed in claim 5, characterized in that at least a part of the first branch including at least one non-linear switching element is common for two columns of picture elements.

7. A display device as claimed in claim 6, characterized in that each of the two columns is provided with a common part of the branch including at least one non-linear switching element.

8. A display device as claimed in claim 1, characterized in that the auxiliary voltage is beyond or on the limit of the range of transition in the transmission/voltage characteristic of the electro-optical medium.

9. A display device as claimed in claim 1, characterized in that the electro-optical medium comprises a liquid crystalline material.

10. A display device as claimed in claim 9, characterized in that the electro-optical medium comprises a ferro-electric liquid crystalline material.

11. A method of driving a display device comprising an electro-optical display medium between two supporting plates, a system of picture elements arranged in rows and columns, with each picture element being formed by picture electrodes arranged on the facing surfaces of the supporting plates, and a system of row and column electrodes, a row of picture elements being selected via the row electrodes during at least a part of a line period and picture display signals being presented via the column electrode, at least a first branch arranged between each picture electrode and a row or column electrode and including at least one non-linear switching element, and a second branch arranged between each picture electrode and a row or column electrode and including at least one non-linear switching element which is arranged anti-parallel to the non-linear switching element of the first branch, the threshold voltage of the first and second branches being different, the method comprising the steps of; prior to presenting a picture display signal by means of the second branch, charging or discharging the picture elements by means of the first branch to a voltage beyond or on the limit of the voltage range to be used for picture display, and subsequently presenting a picture display signal to discharge or charge the picture elements to the value for picture display by means of the second branch.

12. A method as claimed in claim 11, characterized in that the data signal is charged or discharged and presented within the same line selection period for a row of picture elements.

13. A method as claimed in claim 11, characterized in that charging or discharging takes place during a line selection period preceding the line period in which a row of picture elements is selected.

14. A method as claimed in claim 11, characterized in that the voltage across a row of picture elements is presented with a polarity which is inverted with respect to the row of picture elements which is just written.

15. A method as claimed in claim 11, characterized in that the display device comprises a liquid crystalline material.

16. A method as claimed in claim 15, characterized in that the display device comprises a ferro-electric liquid crystalline material.

* * * * *